United States Patent
Ohishi (10) Patent No.: US 10,955,452 B2
(45) Date of Patent: Mar. 23, 2021

(54) WIRE HARNESS CONDUCTION INSPECTION METHOD AND WIRE HARNESS CONDUCTION INSPECTION PROGRAM

(71) Applicant: Yazaki Corporation, Tokyo (JP)

(72) Inventor: Kohta Ohishi, Toyota (JP)

(73) Assignee: Yazaki Corporation, Tokyo (JP)

( * ) Notice: Subject to any disclaimer, the term of this patent is extended or adjusted under 35 U.S.C. 154(b) by 49 days.

(21) Appl. No.: 16/417,773

(22) Filed: May 21, 2019

(65) Prior Publication Data

US 2019/0391197 A1    Dec. 26, 2019

(30) Foreign Application Priority Data

Jun. 25, 2018 (JP) .............................. JP2018-119803

(51) Int. Cl.
*G01R 31/00* (2006.01)
*H01B 7/00* (2006.01)

(52) U.S. Cl.
CPC .......... *G01R 31/005* (2013.01); *H01B 7/0045* (2013.01)

(58) Field of Classification Search
None
See application file for complete search history.

(56) References Cited

U.S. PATENT DOCUMENTS

| | | | |
|---|---|---|---|
| 2012/0126823 A1* | 5/2012 | Lussier | H01R 27/00 |
| | | | 324/555 |
| 2012/0262185 A1 | 10/2012 | Sasaki et al. | |
| 2013/0009649 A1 | 1/2013 | Sasaki et al. | |
| 2013/0024140 A1 | 1/2013 | Kouno et al. | |
| 2013/0061197 A1 | 3/2013 | Funakoshi | |
| 2013/0069668 A1* | 3/2013 | Funakoshi | G01R 31/54 |
| | | | 324/543 |

FOREIGN PATENT DOCUMENTS

| | | |
|---|---|---|
| JP | 2011-137800 A | 7/2011 |
| JP | 2011-170454 A | 9/2011 |
| JP | 2011-180115 A | 9/2011 |

* cited by examiner

*Primary Examiner* — Jas A Sanghera
(74) *Attorney, Agent, or Firm* — Sughrue Mion, PLLC (57) ABSTRACT

A wire harness conduction inspection method performed by a computer includes determining whether wirings included in two wire harnesses arranged in adjacent divided areas are conducted by a connector that connects the two wire harnesses, based on an actual wiring diagram that describes wirings to drive a certain electrical system mounted on a vehicle, a matrix table that describes specification for a wire harness to identify the electrical system constituting a portion of a circuit, for each wire harness mounted on the vehicle, and a connector diagram that describes a connector, a corresponding relationship between the connector and the wirings, and specification for the connector to identify the electrical system constituting the portion of the circuit.

3 Claims, 9 Drawing Sheets

|  | XXX<br>SYSTEM 1 | YYY<br>SYSTEM 2 | ZZZ<br>SYSTEM 3 |
|---|---|---|---|
| 111-AAA | ○ | ○ |  |
| 111-BBB | ○ |  | ○ |
| 111-CCC | ○ |  |  |
| 111-DDD |  | ○ |  |
| 121-EEE | ○ | ○ |  |
| 121-FFF | ○ |  | ○ |
| 121-GGG | ○ |  |  |
| 141-HHH |  | ○ |  |
| 141-III |  |  | ○ |

CONNECTOR 1
XXX

CONNECTOR 2
XXX

CONNECTOR 1
XXX

CONNECTOR 2
XXX

FIG. 10

WIRE HARNESS CONDUCTION INSPECTION METHOD AND WIRE HARNESS CONDUCTION INSPECTION PROGRAM

CROSS-REFERENCES TO RELATED APPLICATIONS

This application is based on Japanese Patent Applications No. 2018-119803 filed on Jun. 25, 2018, the entire contents of which are incorporated herein by reference.

BACKGROUND

1. Technical Field

The invention relates to a wire harness conduction inspection method and a wire harness conduction inspection program that perform conduction inspection on a circuit constituting a wire harness, during circuit design of the wire harness mounted on a vehicle by a computer.

2. Related Art

JP-A-2011-137800, JP-A-2011-170454 and JP-A-2011-180115 disclose a wire harness conduction inspection device, a wire harness conduction inspection method and a wire harness conduction inspection program that perform conduction inspection on a circuit constituting a wire harness, at a step of circuit design of the wire harness mounted on a vehicle by a computer.

Figure 10:
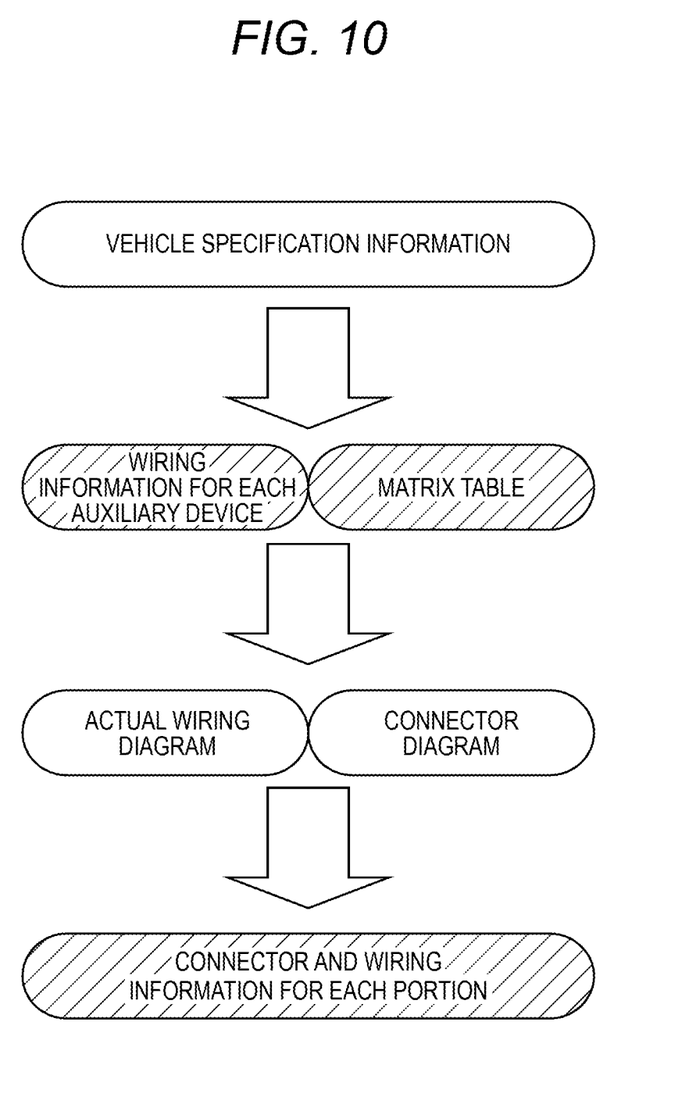
FIG. 10 is a schematic diagram showing the flow of the circuit design of the wire harness by the computer.

A flow of circuit design of a wire harness by a computer will be described with reference to FIG. 10. FIG. 10 is a schematic diagram showing the flow of the circuit design of the wire harness by the computer.

As shown in FIG. 10, during the circuit design of the wire harness, a circuit is designed by using wiring information for each auxiliary device and a matrix table that are created from vehicle specification information, and connector and wiring information for each portion is created as a deliverable.

The vehicle specification information is information serving as a start point of the circuit design of the wire harness and defining specification of a certain vehicle. The vehicle specification information describes an electrical system mounted on the vehicle for each condition such as vehicle grade or a region where the vehicle is used, and an electrical system that can be additionally mounted on the vehicle.

The wiring information for each auxiliary device is information created based on the vehicle specification information. The wiring information for each auxiliary device is prepared for each electrical system that is mounted on the vehicle and independently driven, such as a headlamp system, an air bag system, an air conditioning system, an engine control system and an ABS system. In order to drive the electrical system, it is necessary to connect electrical components (for example, a battery, an Electronic Control Unit (ECU) and a drive device) constituting the electrical system by a signal wire, a power supply wire and a ground wire. The wiring information for each auxiliary device includes connection information of circuit wires, for example, a start point or an end point of an electric wire among the power supply wire and the ground wire is connected to which terminal of which electrical component and to which electric wire, and auxiliary information on an auxiliary device that connects electric wires such as the signal wire, the power supply wire and the ground wire with the electrical components.

The matrix table is information created based on the vehicle specification information created for each of vehicles of various vehicle types. The matrix table is the information describing corresponding relationship between a number identifying a wire harness and specification required for each wire harness. The corresponding relationship may be described by the matrix having "product number column" and "specification code row".

The circuit is designed by using the above-described wiring information for each auxiliary device and the matrix table, and the connector and wiring information for each portion is created as the deliverable. The circuit design using the wiring information for each auxiliary device and the matrix table will be described in more detail.

Since the main object of the wiring information for each auxiliary device is to represent the circuit wires of the electrical system including a plurality of electrical components, information on the electric wires constituting the wire harness is not included. The matrix table associates the specification realized by the electrical system with the wire harness. Therefore, the circuit design of the wire harness is performed while the electrical system defined in the wiring information for each auxiliary device is fitted to the specification of the wire harness described in the matrix table. In this process, an actual wiring diagram and a connector diagram are created as intermediate deliverables, and the connector and wiring information for each portion is created from the actual wiring diagram and the connector diagram.

In the inventions disclosed in JP-A-2011-137800, JP-A-2011-170454 and JP-A-2011-180115, the conduction inspection is performed by analyzing with the computer, the connector and wiring information for each portion generated as the deliverable. Specifically, the wire harness including the electric wires such as the signal wire, the power supply wire and the ground wire described in the wiring information for each auxiliary device is specified from the matrix table, and the start point of the electric wire is specified in the connector and wiring information for each portion that describes the wire harness. When the end point can be reached by following the electric wire described in the connector and wiring information for each portion, conduction is successful. When the start point cannot be specified or the end point cannot be reached, the conduction fails. As described above, the conduction inspection method disclosed in JP-A-2011-137800, JP-A-2011-170454 and JP-A-2011-180115 requires the wiring information for each auxiliary device, the matrix table and the connector and wiring information for each portion (shaded information in FIG. 10).

In the conduction inspection method disclosed in JP-A-2011-137800, JP-A-2011-170454 and JP-A-2011-180115, since the connector and wiring information for each portion is required, of course, it is necessary to create the connector and wiring information for each portion once in order to perform the conduction inspection. In other waords, when the connector and wiring information for each portion have not yet been created, the conduction inspection cannot be performed. The process of creating the connector and wiring information for each portion is a very time-consuming work, and the work of creating again the connector and wiring information for each portion created before in response to a result of the conduction inspection needs much manpower. Therefore, there is a demand for the conduction inspection method that can be performed at an intermediate stage before the connector and wiring information for each portion is created.

The present invention is made in view of the above-described circumstances, and an object thereof is to provide a wire harness conduction inspection method and a wire harness conduction inspection program capable of performing conduction inspection at the intermediate stage before connector and wiring information for each portion is created once, during circuit design of a wire harness by a computer.

SUMMARY OF INVENTION

According to an aspect of the invention, (1) A wire harness conduction inspection method performed by a computer includes determining whether wirings included in two wire harnesses arranged in adjacent divided areas are conducted by a connector that connects the two wire harnesses, based on an actual wiring diagram that describes wirings to drive a certain electrical system mounted on a vehicle, a matrix table that describes specification for a wire harness to identify the electrical system constituting a portion of a circuit, for each wire harness mounted on the vehicle, and a connector diagram that describes a connector, a corresponding relationship between the connector and the wirings, and specification for the connector to identify the electrical system constituting the portion of the circuit.

(2) The wire harness conduction inspection method according to (1), includes:

detecting the connector that connects the two wire harnesses with reference to the actual wiring diagram;

specifying a pair of wire harnesses having common specification assigned to the wire harnesses among the wire harnesses wired in each of the adjacent divided areas with reference to the matrix table;

specifying the connector to which specification identical to the common specification of the pair of wire harnesses specified in the wire harness specification step is assigned with reference to the connector diagram; and a conduction determination step of determining whether the wirings included in the two wire harnesses are conducted by the connector with reference to the connector diagram that describes the connector specified by the connector specification step and the actual wiring diagram that describes the wirings of the electrical system to which the common specification is assigned.

(3) The wire harness conduction inspection method according to (2) further includes outputting conduction success/failure determined in the conduction determination step, and wherein the result output step presents failed inspection items as well as one or more matrix tables, actual wiring diagrams and connector diagrams having erroneous descriptions when outputting the conduction failure.

(4) A wire harness conduction inspection program causes a computer to execute each step of the conduction inspection method according to any of (1) to (3).

According to the wire harness conduction inspection method of a configuration of (1), with reference to the matrix table, the actual wiring diagram and the connector diagram, the conduction inspection can be performed on a connection part of W to W connection at the intermediate stage before the connector and wiring information for each portion is created, and the actual wiring diagram and the connector diagram as the intermediate deliverables can be verified. Accordingly, the manpower for creating the connector and wiring information for each portion can be reduced by lowering frequency of correcting the connector and wiring information for each portion that has been generated so far.

According to the wire harness conduction inspection method of a configuration of (2), the wirings used for the W to W connection can be specified with high accuracy. The wire harness may include a plurality of connectors to which the same identifier is assigned. Only by specifying a connector, the connector may be not used for the W to W connection on which the conduction inspection is desired to perform. According to the invention, the connector used for the W to W connection is specified from the specification described in the matrix table. Therefore, the connector used for the W to W connection can be specified by simple processing, and inspection accuracy can be improved in order to perform the conduction inspection on the wirings that truly requires the conduction inspection.

According to the wire harness conduction inspection method of a configuration of (3), when the circuit designer is notified that the conduction inspection fails, information useful for the circuit designer can be provided by presenting the failed inspection items as well as the information having erroneous descriptions (one or more matrix tables, actual wiring diagrams and connector diagrams).

According to the wire harness conduction inspection program of a configuration of (4), with reference to the matrix table, the actual wiring diagram and the connector diagram, the conduction inspection can be performed on the connection part of the W to W connection at the intermediate stage before the connector and wiring information for each portion is created, and the actual wiring diagram and the connector diagram as the intermediate deliverables can be verified. Accordingly, the manpower for creating the connector and wiring information for each portion can be reduced by lowering frequency of correcting the connector and wiring information for each portion that has been generated so far.

In the wire harness conduction inspection method and the wire harness conduction inspection program of the invention, during the circuit design of the wire harness by the computer, the conduction inspection can be performed at the intermediate stage before the connector and wiring information for each portion is created once.

The invention has been briefly described as above. Details of the invention will be further clarified by reading a mode (hereinafter referred to as "embodiment") for carrying out the invention described below with reference to attached drawings.

DESCRIPTION OF EMBODIMENTS

Specific embodiments of the invention will be described below with reference to the drawings.

The inventor has verified cause of conduction failure by the conduction inspection using the wiring information for each auxiliary device, the matrix table and the connector and wiring information for each portion in related art, and has found that the cause may be due to the erroneous descriptions occurring in the actual wiring diagram and the connector diagram created as the intermediate deliverables. In consideration of this finding, by performing the conduction inspection on the actual wiring diagram and the connector diagram created as the intermediate deliverables in the process of creating the connector and wiring information for each portion, verification is performed during creation of the connector and wiring information for each portion, whereby the invention aims to reduce the manpower required to complete the connector and wiring information for each portion.

[Summary of Conduction Inspection Method of Invention]

Figure 1:
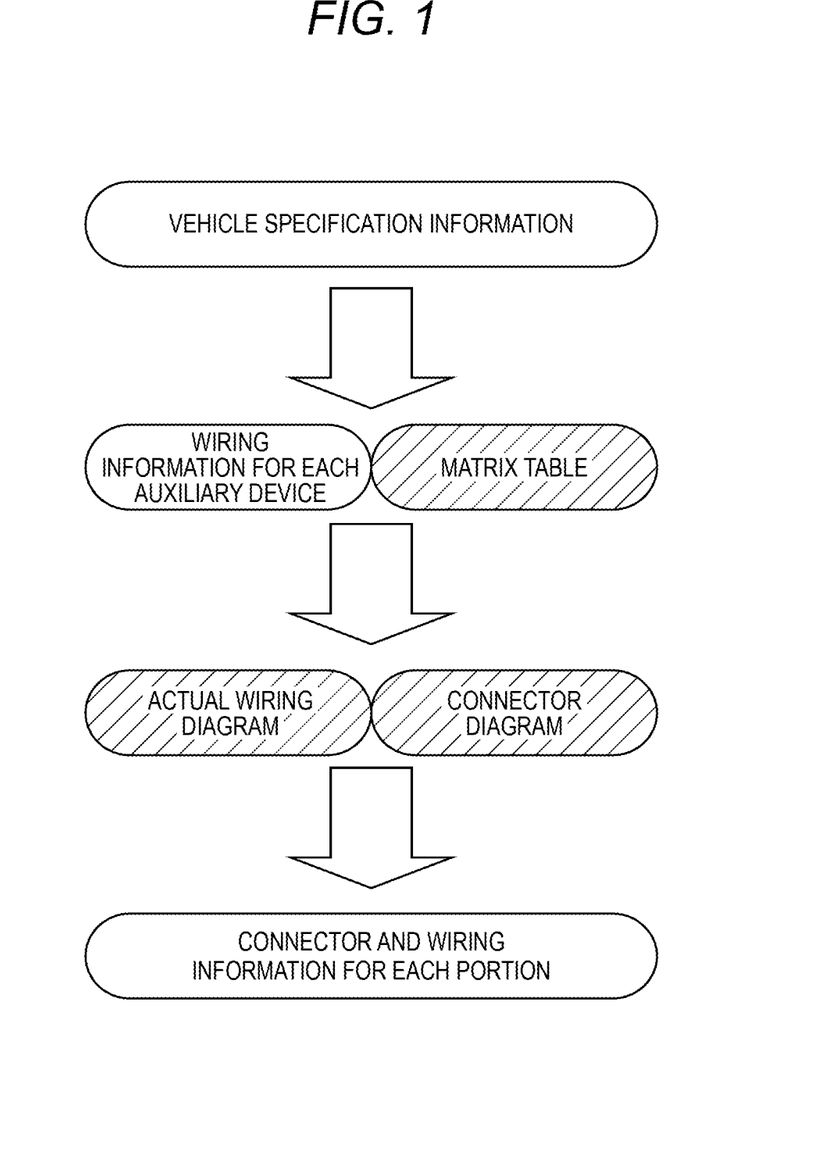
FIG. 1 is a schematic diagram showing a flow of circuit design of a wire harness by a computer according to a wire harness conduction inspection method and a wire harness conduction inspection program of the invention.

Therefore, features of the wire harness conduction inspection method and the wire harness conduction inspection program of the invention will be briefly described at first with reference to FIG. 1. FIG. 1 is a schematic diagram showing a flow of circuit design of a wire harness by a computer according to a wire harness conduction inspection method and a wire harness conduction inspection program of the invention. The flow of the circuit design of the wire harness is the same as the flow described with reference to FIG. 10. In the processing as a feature of the conduction inspection method of the invention, when the circuit design of the wire harness is performed by a computer, with reference to a matrix table, an actual wiring diagram and a connector diagram (shaded information in FIG. 1), conduction inspection is performed on a connection part of W to W connection described below at the intermediate stage before connector and wiring information for each portion is created, and the actual wiring diagram and the connector diagram as the intermediate deliverables are verified. Hereinafter, the wire harness conduction inspection method of the invention and the conduction inspection method according to the wire harness conduction inspection program of the invention will be described in detail.

[Description of Information Used in Conduction Inspection Method of Invention]

Figure 2:
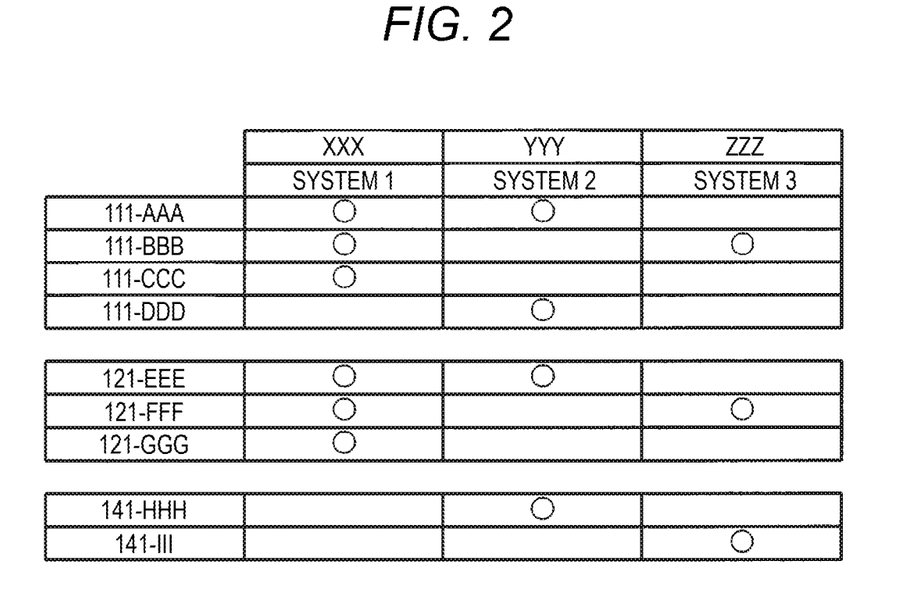
FIG. 2 shows a matrix table.
Figure 3:
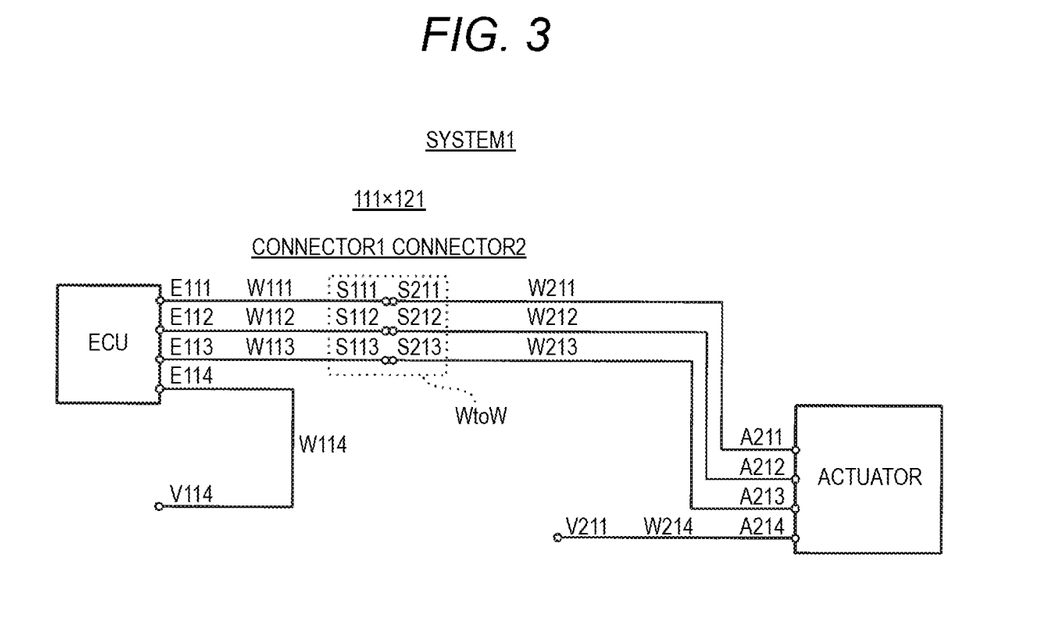
FIG. 3 shows an actual wiring diagram.
Figure 4:
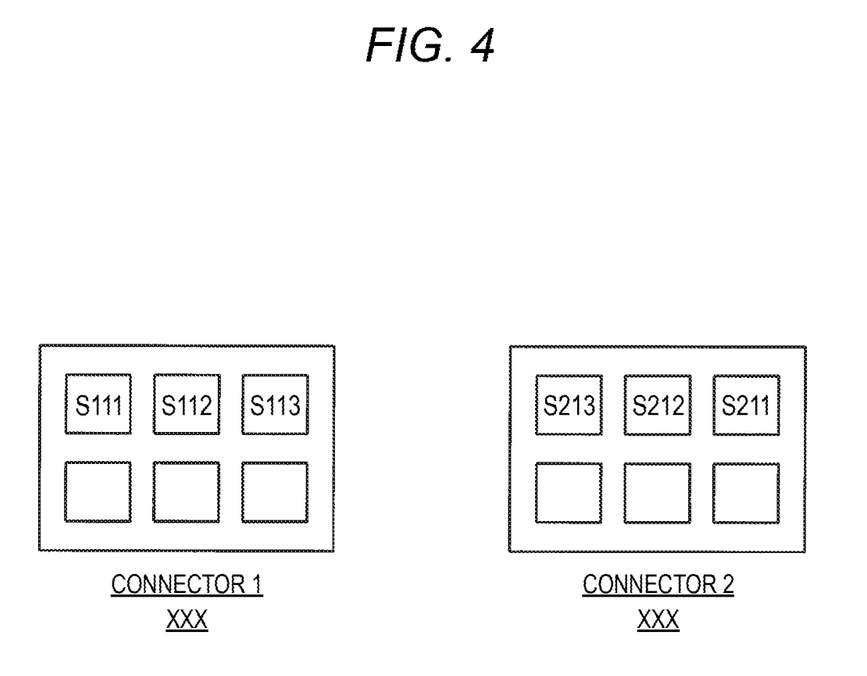
FIG. 4 shows a connector diagram.

First, the matrix table, the actual wiring diagram and the connector diagram will be described with reference to FIGS. 2 to 4, and then a flow of conduction inspection processing using the matrix table, the actual wiring diagram and the connector diagram will be described. FIG. 2 shows the matrix table. FIG. 3 shows the actual wiring diagram. FIG. 4 shows the connector diagram. Since the vehicle specification information and the wiring information for each auxiliary device have already been described, description thereof will be omitted.

[Description of Matrix Table]

The matrix table is information created based on the vehicle specification information created for each of vehicles of various vehicle types. The matrix table is the information describing corresponding relationship between a number identifying a wire harness and specification required for each wire harness. As shown in FIG. 2, in the matrix table referred to in the invention, the corresponding relationship is described by a matrix in which "wire harness numbers" (III-AAA, III-BBB . . . 141-III) are arranged in a vertical direction and "specification codes" (XXX, YYY and ZZZ) and are arranged in a horizontal direction. In an actual matrix table, the number of the "wire harness numbers" and the "specification codes" is set to be larger than that of the matrix table shown in FIG. 2. However, in the embodiment, the number thereof is reduced for easy understanding of the invention.

Here, a naming rule of the wire harness numbers described in the embodiment of the invention will be described. Wire harnesses are divided and arranged for each space (engine room, instrument panel area, vehicle interior wall, trunk room and the like. Hereinafter these areas will be referred to as divided areas.) into which vehicle space is divided by function. By connecting the wire harnesses wired in adjacent divided areas via a connector, a circuit network is formed in which electrical connection necessary for electrical components installed at various parts of the vehicle is made. A connection mode of connecting the wire harnesses wired in the adjacent divided areas via connectors provided at end portions of both the wire harnesses is referred to as "W to W (Wire to Wire)" in the specification. In order to identify the wire harnesses wired in each of the divided areas, the wire harness numbers in the specification identify in which divided area the wire harnesses are wired by a character string before "-(hyphen)".

Since the wire harnesses corresponds to different vehicle specification depending on the vehicle grade, the destination where the vehicle is driven, presence or absence of the electrical system that can be additionally mounted on the vehicle, or the like, a plurality of candidates for the wire harnesses that can be wired in each divided area are prepared. The wire harness numbers in the specification identify which candidate the wire harnesses are by a character string after "-(hyphen)".

Next, the specification codes described in the embodiment of the invention will be described. The wire harnesses constitute a circuit network that connects various electrical components mounted on the vehicle to construct various electrical systems. As described above, the wire harnesses are divided for each divided area, and electrical systems constructed by vehicle specification are increased or decreased. Therefore, for each wire harness, an electrical system in which the wire harness is involved in a circuit configuration is different. Therefore, a specification code is assigned to identify in which circuit configuration of the electrical system each wire harness is involved. Examples of the specification code include code for identifying the electrical system such as a headlamp system, an air bag system, an air conditioning system, an engine control system, an anti-lock brake system, a steering system and a wiper system. In the matrix table shown in FIG. 2, three specification codes XXX, YYY and ZZZ are arranged in the horizontal direction.

In the matrix table shown in FIG. 2, the corresponding relationship is described by the matrix in which the "wire harness numbers" are arranged in the vertical direction and the "specification codes" are arranged in the horizontal direction. A cell to which "O" is assigned indicates that specification for realizing an electrical system identified by a "specification code" is adopted by a wire harness identified by a "wire harness number". For example, the specification for realizing electrical systems identified by "XXX" and "YYY" is adopted by a wire harness identified by "111-

AAA". Such a matrix table is created based on the vehicle specification information created for each of vehicles of various vehicle types.

[Description of Actual Wiring Diagram]

The actual wiring diagram is information created based on the wiring information for each auxiliary device and the matrix table, and is created for each of the above-described electrical systems. The actual wiring diagram describes and adds information on the electric wires to the circuit wires described in the wiring information for each auxiliary device, and the information on the circuit wires is sorted for each divided area. When a certain circuit wire described in the wiring information for each auxiliary device is connected to a plurality of electrical components across a plurality of divided areas in the actual wiring diagram, the actual wiring diagram describes information on a terminal or a connector that is connected to a terminal of electric component at the start point and the end point of the circuit wire. Further, the actual wiring diagram describes information on each electric wire located in a divided area and information (information indicating a case where an electric wire end portion is connected by welding or abut crimping) on an auxiliary device such as a connector for connecting electric wire end portions located in respective divided areas, an Electronic Control Unit (ECU) Junction Box (JB), a Joint Connector (JC) and the like. As described above, the actual wiring diagram describing the information of the electric wires is created for each system mounted on the vehicle. Hereinafter, the actual wiring diagram will be described with reference to FIG. 3.

The actual wiring diagram shown in FIG. 3 is described with respect to an electrical system "SYSTEM 1" to which the specification code XXX is assigned in the matrix table shown in FIG. 2. The "SYSTEM 1" is an electrical system that mainly controls ACTUATOR located on a right side of FIG. 3 by ECU located on a left side of FIG. 3. It is described that the ECU is provided with terminals E111, E112, E113 and E114. In addition, it is described that the ACTUATOR is provided with terminals A211, A212, A213 and A214. The ECU is powered from a terminal V114 to the terminal E114 via a power supply wire W114, and the ACTUATOR is powered from a terminal V214 to the terminal A214 via a power supply wire W214.

The actual wiring diagram shown in FIG. 3 describes connectors CONNECTOR 1 and CONNECTOR 2, and a plurality of terminals S111, S112, S113, S211, S212 and S213 directly below description of "111×121". This means that wire harnesses wired in a divided area 111 and a divided area 121 are in the W to W connection via the connectors CONNECTOR 1 and CONNECTOR 2, and electric wires W111, W112, W113, W211, W212 and W213 that constitute the respective wire harnesses are connected via the terminals S111, S112, S113, S211, S212 and S213. As described above, the actual wiring diagram describes and adds the information on the electric wires to the circuit wires described in the wiring information for each auxiliary device, and the information on the circuit wires is sorted for each divided area and the wire harnesses are in the W to W connection.

[Description of Connector Diagram]

The connector diagram describes the specification such as a number, a terminal accommodated in a housing, a cavity in which the terminal is accommodated, color of the housing and the like for all connectors constituting the wire harnesses. FIG. 4 is the connector diagram describing specification of the connector CONNECTOR 1 and the connector CONNECTOR 2 described in the actual wiring diagram of FIG. 3. In the connector diagram shown in FIG. 4, connector shapes are drawn as a plan view as viewed from a front side of fitting a target connector to a mating connector. As shown in FIG. 4, six cavities are formed as specification of the connector CONNECTOR 1, and the terminals SI 11 to S113 are defined to be respectively accommodated in three cavities located at an upper stage. Similarly, six cavities are formed as specification of the connector CONNECTOR 2, and the terminals S211 to S213 are defined to be respectively accommodated in three cavities located at an upper stage. Further, it is described that the connectors CONNECTOR 1 and CONNECTOR 2 are provided in a circuit that realizes an electrical system to which the specification code "XXX" is assigned.

[Conduction Inspection Method According to Embodiment of Invention]

The matrix table, the actual wiring diagram and the connector diagram have been described so far. The flow of the conduction inspection processing by the computer using the matrix table, the actual wiring diagram and the connector diagram will be described from now on.

[Description of Actual Wiring Diagram and Connector Diagram at Connection Part of W to W connection]

First, for easy understanding of the invention, description will be given on the actual wiring diagram and the connector diagram when a plurality of circuit wires in the actual wiring diagram to which different specification codes are assigned are in W to W connection at the same connection part. Here, it is assumed that the SYSTEM 2 to which the specification code "YYY" shown in the matrix table of FIG. 2 is assigned and the SYSTEM 3 to which the specification code "ZZZ" is assigned are in the W to W connection at the connection part described in SYSTEM 1 shown in FIG. 3.

Figure 5A:
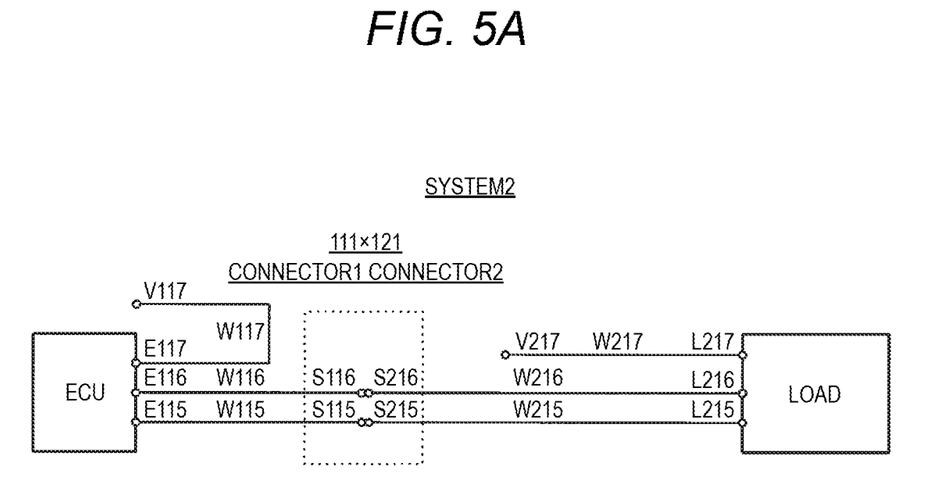
FIG. 5A shows an actual wiring diagram of SYSTEM 2.
Figure 5B:
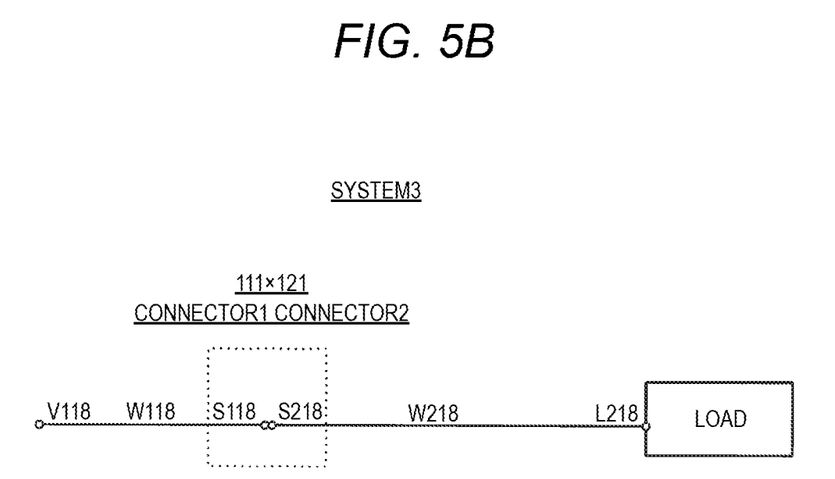
FIG. 5B shows an actual wiring diagram of SYSTEM 3.

FIG. 5A shows an actual wiring diagram of SYSTEM 2, and FIG. 5B shows an actual wiring diagram of SYSTEM 3. As shown in FIG. 5A, the "SYSTEM 2" is an electrical system that mainly controls LOAD located on a right side of FIG. 5A by ECU located on a left side of FIG. 5A. It is described that the ECU is provided with terminals E115, E116 and E117. In addition, it is described that the LOAD is provided with terminals L215, L216 and L217. The ECU is powered from a terminal V117 to the terminal E117 via a power supply wire W117, and the LOAD is powered from a terminal V217 to the terminal L217 via a power supply wire W217. The "SYSTEM 3" is an electrical system in which electric power is supplied from a terminal V118 located on a left side of FIG. 5B to a terminal L218 of LOAD located on a right side of FIG. 5B via wires W118 and W218.

Figure 6A:
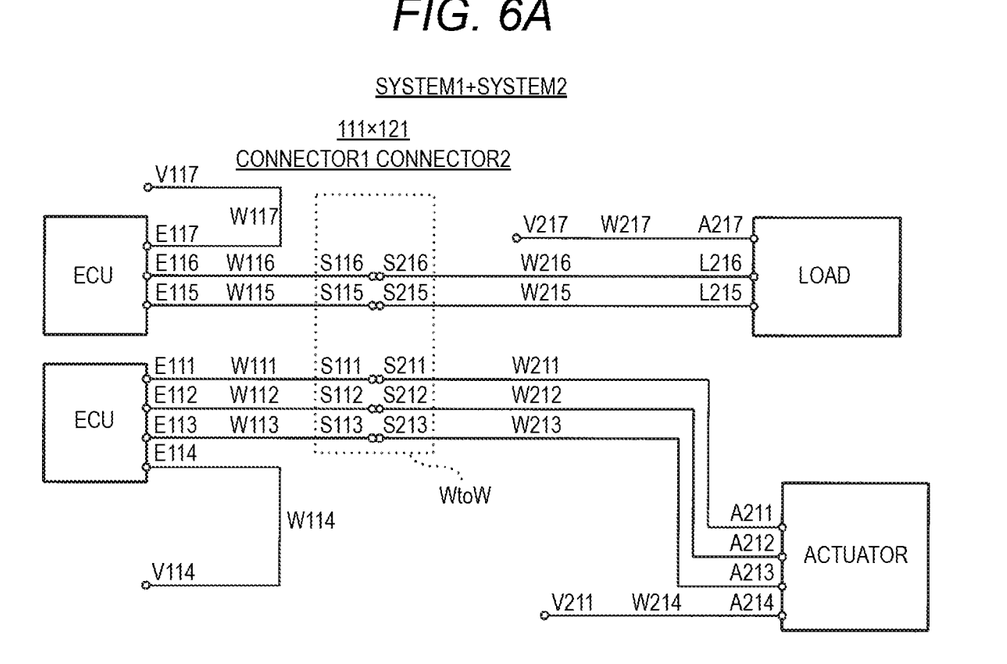
FIG. 6A is an actual wiring diagram obtained by integrating "SYSTEM 1" and "SYSTEM 2"
Figure 6B:
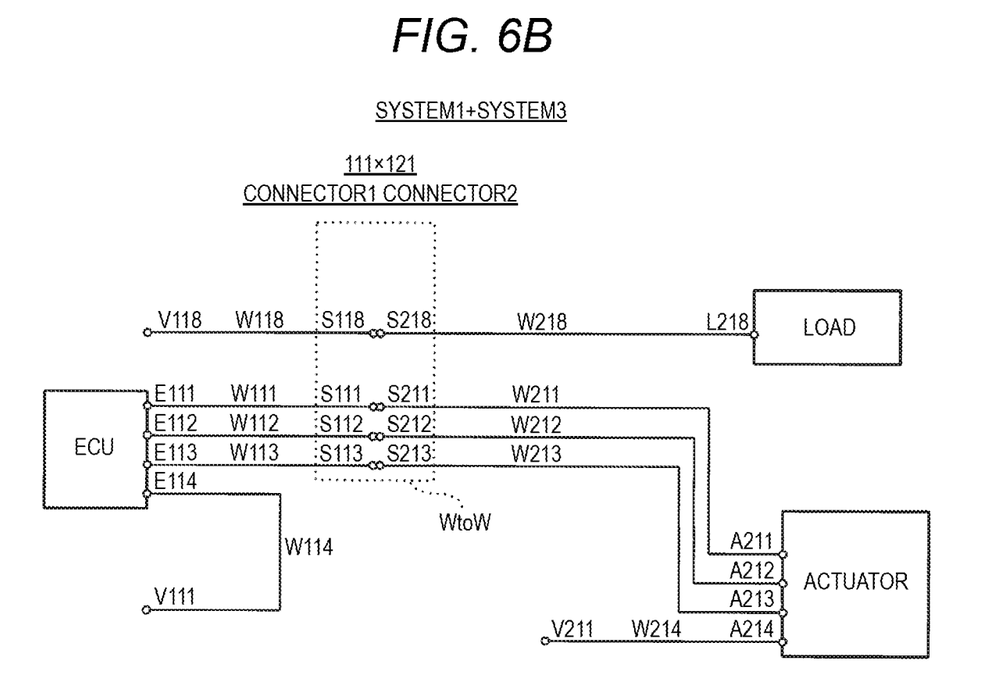
FIG. 6B is an actual wiring diagram obtained by integrating "SYSTEM 1" and "SYSTEM 3".

Here, among wire harnesses wired in the divided area 111 in the matrix table shown in FIG. 2, a wire harness 111-AAA includes circuit wires that realize the "SYSTEM 1" and the "SYSTEM 2", a wire harness 111-BBB includes circuit wires that realize the "SYSTEM 1" and the "SYSTEM 3", and a wire harness 111-CCC includes circuit wires that realize only the "SYSTEM 1". Similarly, among wire harnesses wired in the divided area 121, a wire harness 121-EEE includes circuit wires that realize the "SYSTEM 1" and the "SYSTEM 2", a wire harness 121-FFF includes circuit wires that realize the "SYSTEM 1" and the "SYSTEM 3", and a wire harness 121-GGG includes circuit wires that realize only the "SYSTEM 1". For reference, FIG. 6A shows an actual wiring diagram in which the "SYSTEM 1" and the "SYSTEM 2" are integrated, and FIG. 6B shows an actual wiring diagram in which the "SYSTEM 1" and the "SYSTEM 3" are integrated. In the actual wiring diagram in which the "SYSTEM 1" and the "SYSTEM 2" are integrated as shown in FIG. 6A, the terminals Sill, S112, S113, S211, S212 and S213 of the "SYSTEM 1", and terminals S115, S116, S215, and S216 of the "SYSTEM 2" are in the W to W connection by the same connectors CONNECTOR 1 and CONNECTOR 2. Similarly, in the actual wiring diagram in which the "SYSTEM 1" and the "SYSTEM 3" are integrated as shown in FIG. 6B, the terminals S111, S112, S113, S211, S212 and S213 of the "SYSTEM 1", and terminals S118 and S218 of the "SYSTEM 3" are in the W to W connection by the same connectors CONNECTOR 1 and CONNECTOR 2.

Figure 7A:
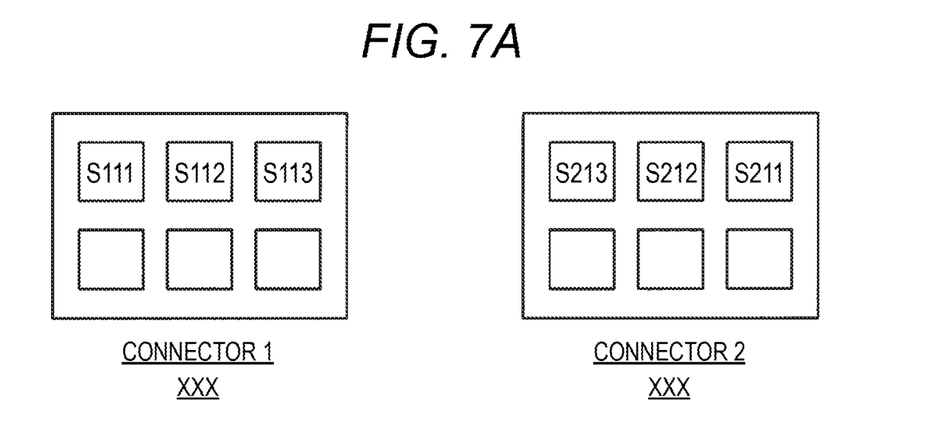
FIGS. 7A to 7C show connector diagrams of SYSTEM 1, SYSTEM 2, and SYSTEM 3.
Figure 7B:
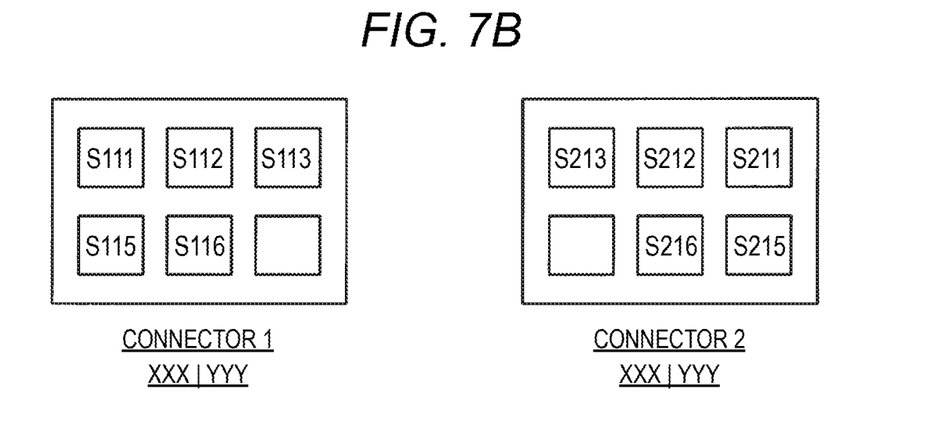
Figure 7C:
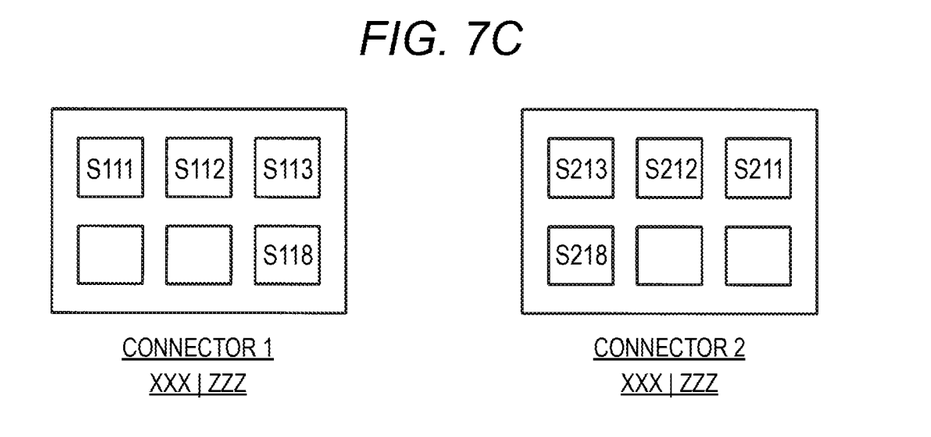

CONNECTOR 1 and CONNECTOR 2 used for the W to W connection are described in connector diagrams as shown in FIGS. 7A to 7C. FIG. 7A shows a connector diagram of the SYSTEM 1, FIG. 7B shows a connector diagram used for the "SYSTEM 1" and the "SYSTEM 2", and FIG. 7C shows a connector diagram used for the "SYSTEM 1" and the "SYSTEM 3". FIG. 7 describes the connector diagram (FIG. 7A) including the circuit wires that realize the "SYSTEM 1", the connector diagram (FIG. 7B) including the circuit wires that realize the "SYSTEM 1" and the "SYSTEM 2" and the connector diagram (FIG. 7C) including the circuit wires realize the "SYSTEM 1" and the "SYSTEM 3" as different connector diagrams. In the connector diagram as shown in FIG. 7A, when circuit wires used in a certain electrical system are in the W to W connection by certain connectors, a specification code corresponding to the electrical system is described in association. Specifically, the connector diagram shown in FIG. 7A describes the specification code "XXX" corresponding to the "SYSTEM 1" in association with the connectors CONNECTOR 1 and CONNECTOR 2. As shown in FIGS. 7B and 7C in the connector diagrams, when circuit wires used in a plurality of electrical systems are in the W to W connection by certain connectors, specification codes corresponding to the electrical systems are described in association. Specifically, in the connector diagram shown in FIG. 7B, the specification codes "XXX" and "YYY" corresponding to the "SYSTEM 1" and the "SYSTEM 2" are described in association with the connectors CONNECTOR 1 and CONNECTOR 2. In the connector diagram shown in FIG. 7C, the specification codes "XXX" and "ZZZ" corresponding to the "SYSTEM 1" and the "SYSTEM 3" are described in association with the connectors CONNECTOR 1 and CONNECTOR 2.

In addition, the connector diagram describes a terminal accommodated in a cavity for each cavity formed in the connector. Specifically, in the connector diagram shown in FIG. 7A, the terminals S111, S112 and S113 are described with respect to the connector CONNECTOR 1, and the terminals S211, S212 and S213 are described with respect to the connector CONNECTOR 2. Similarly, in the connector diagram shown in FIG. 7B, the terminals S111, S112, S113, S115 and S116 are described with respect to the connector CONNECTOR 1, and the terminals S211, S212, S213, S215 and S216 are described with respect to the connector CONNECTOR 2. Similarly, in the connector diagram shown in FIG. 7C, the terminals S111, S112, S113 and S118 are described with respect to the connector CONNECTOR 1, and the terminals S211, S212, S213 and S218 are described with respect to the connector CONNECTOR 2.

Figure 8:
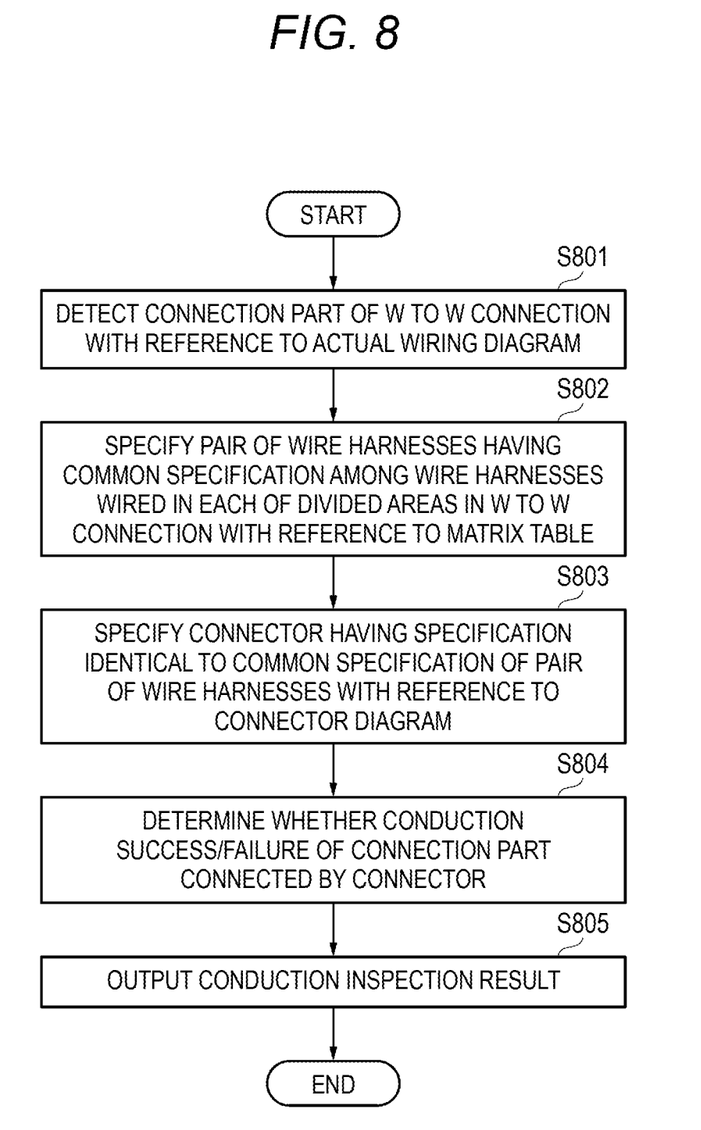
FIG. 8 is a flowchart showing a flow of processing according to the wire harness conduction inspection method of the invention.

When the actual wiring diagram and the connector diagram are described correctly, the W to W connection should be described in accordance with description rules shown in FIGS. 5 and 7. On the contrary, when a description is made different from the description rules in the actual wiring diagram and the connector diagram, it can be said that the description is a place where the conduction inspection fails. Hereinafter, the flow of processing according to the conduction inspection method of the invention will be described with reference to FIG. 8. FIG. 8 is a flowchart showing the flow of the processing according to the wire harness conduction inspection method of the invention.

[Details of Conduction Inspection Method]

[Processing of Specifying Connection Part of W to W Connection]

First, one actual wiring diagram is selected, and a connection part of the W to W connection in the actual wiring diagram is detected (S801, referred to as a connection part detection step in the specification). As described with reference to FIG. 3, a part where the wire harnesses are in the W to W connection is described in the actual wiring diagram. Specifically, by detecting the character string "111× 121" or a symbol with two consecutive marks indicating terminals as shown in FIG. 3, the connection part of the W to W connection is detected.

[Processing of Specifying Connectors Used for W to W Connection]

The wire harnesses wired in the adjacent divided areas are connected at one connection part of the W to W connection. As described above, each wire harness includes the electric wires constituting various electrical systems, and the circuit wires of various electrical systems may be realized across two wire harnesses at one connection part of the W to W connection as shown in FIG. 6. Therefore, it is preferable to specify connectors that enable the W to W connection, and to perform the conduction inspection on the connector basis.

Therefore, first, a method for specifying the connector having the W to W connection will be described. When it is detected that the connection part of the W to W connection is "111×121" in the above-described connection part detection step S801, the wire harness wired in the divided area "111" and the wire harness wired in the divided area "121" are extracted with reference to the matrix table shown in FIG. 2. As a result, wire harnesses having the numbers "111-AAA", "111-BBB", "111-CCC" and "111-DDD" are extracted as the wire harnesses wired in the divided area "111". Similarly, wire harnesses having the numbers "121-EEE", "121-FFF" and "121-GGG" are extracted as the wire harnesses wired in the divided area "121".

Specification codes assigned to the wire harnesses having the numbers are compared with the wire harnesses extracted as described above, and a pair including a wire harness wired in the divided area "111" and a wire harness wired in the divided area "121" that coincide with each other in specification code is specified (S802, referred to as a wire harness specification step in the specification). As shown in FIG. 2, the wire harness "111-AAA" wired in the divided area "111" and the wire harness "121-EEE" wired in the divided area "121" coincide with each other in the specification codes "XXX" and "YYY". Similarly, the wire harness "111-BBB" wired in the divided area "111" and the wire harness "121-FFF" wired in the divided area "121" coincide with each other in the specification codes "XXX" and "ZZZ". Similarly, the wire harness "111-CCC" wired in the divided area "111" and the wire harness "121-GGG" wired in the divided area "121" coincide with each other in the specification code "XXX". Three pairs are specified in this way.

When the pair including the wire harness wired in the divided area "111" and the wire harness wired in the divided area "121" is specified as described above, subsequently, connectors that performs the W to W connection on the pair of wire harnesses is specified with reference to the connector diagram (S803, referred to as a connector specification step in the specification). As shown in FIG. 7, the specification codes are described in association with the connectors CONNECTOR 1 and CONNECTOR 2 in the connector diagrams. When the pair including the wire harness wired in the divided area "111" and the wire harness wired in the divided area "121" is selected, a specification code in which the pair coincides with each other can be specified. Therefore, when the pair including the wire harness wired in the divided area "111" and the wire harness wired in the divided area "121" is specified as described above, the connectors used for the W to W connection can be specified from the connector diagram by following the common specification code.

This will be described in detail with reference to FIGS. 2 and 7. As shown in FIG. 2, the pair of the wire harness "111-AAA" wired in the divided area "111" and the wire harness "121-EEE" wired in the divided area "121" coincides with each other in the specification codes "XXX" and "YYY". In the connector diagrams shown in FIG. 7, the specification codes "XXX" and "YYY" are associated with the connectors CONNECTOR 1 and CONNECTOR 2 in the connector diagram shown in FIG. 7B. In this way, in the pair of the wire harness "111-AAA" wired in the divided area "111" and the wire harness "121-EEE" wired in the divided area "121", the connectors CONNECTOR 1 and CONNECTOR 2 shown in FIG. 7B are specified as being used for the W to W connection. Similarly, the pair of the wire harness "111-BBB" wired in the divided area "111" and the wire harness "121-FFF" wired in the divided area "121" coincides with each other in the specification codes "XXX" and "ZZZ". In the connector diagrams shown in FIG. 7, the specification codes "XXX" and "ZZZ" are associated with the connectors CONNECTOR 1 and CONNECTOR 2 in the connector diagram shown in FIG. 7C. In this way, in the pair of the wire harness "111-BBB" wired in the divided area "111" and the wire harness "121-FFF" wired in the divided area "121", the connectors CONNECTOR 1 and CONNECTOR 2 shown in FIG. 7C are specified as being used for the W to W connection.

In addition, the pair of the wire harness "111-CCC" wired in the divided area "111" and the wire harness "121-GGG" wired in the divided area "121" coincides with each other in the specification code "XXX". In the connector diagrams shown in FIG. 7, the specification code "XXX" is associated with the connectors CONNECTOR 1 and CONNECTOR 2 as shown from FIGS. 7A to 7C. In this case, one connector CONNECTOR 1 shown in FIG. 7A may be used for the W to W connection with each of the three connectors CONNECTOR 2 shown in FIGS. 7A to 7C. Similarly, one connector CONNECTOR 1 shown in FIG. 7B or 7C may be used for the W to W connection with each of the three connectors CONNECTOR 2 shown in FIGS. 7A to 7C. As described above, in the pair of the wire harness "111-CCC" wired in the divided area "111" and the wire harness "121-GGG" wired in the divided area "121", nine patterns are specified as the connectors used for the W to W connection.

As described above, the connectors used for the W to W connection are specified. Then, the connectors become targets of the conduction inspection by [processing of determining conduction success/failure of circuit wire] described below. Hereinafter, it will be described below that processing of verifying conduction success/failure of a circuit wire is performed after the connectors CONNECTOR 1 and CONNECTOR 2 used for the W to W connection are fitted (S804, referred to as a conduction determination step in the specification).

[Processing of Determining Conduction Success/Failure of Circuit Wire]

Various items are used for determining whether conduction is enabled by the fitted two connectors CONNECTOR 1 and CONNECTOR 2. Here, each of the items will be described.

[Success/Failure Determination According to Connector Correspondence Table]

The connectors additionally include a correspondence table indicating corresponding relationship between the two fitted connectors. Specifically, the correspondence table is used to indicate the corresponding relationship between a connector number assigned to a certain connector and a connector number assigned to another connector fitted to the connector. In the embodiment, CONNECTOR 1 and CONNECTOR 2 are identifiers assigned to the connectors, and in practice the identifiers correspond to the numbers assigned to the connectors. Therefore, when it is described that the numbers of the connectors CONNECTOR 1 and CONNECTOR 2 are searched in the correspondence table described above, and the two numbers correspond to each other, it is determined that the connectors CONNECTOR 1 and CONNECTOR 2 can be fitted from a viewpoint of housing shape. When it is described that the two numbers do not correspond to each other, it is determined that one or both of the connector CONNECTOR 1 and the connector CONNECTOR 2 are erroneously described in the connector diagram.

[Success/Failure Determination According to Specification Set in Connectors]

A specification code is assigned to each connector in the connector diagram. The two connectors CONNECTOR 1 and CONNECTOR 2 used for the W to W connection should coincide with each other in some or all of the specification codes. Therefore, when some of the specification codes assigned to the connectors CONNECTOR 1 and CONNECTOR 2 coincide with each other, it is determined that the connectors CONNECTOR 1 and CONNECTOR 2 can be fitted from a viewpoint of specification code. When the assigned specification codes do not coincide, it is determined that one or both of the connector CONNECTOR 1 and the connector CONNECTOR 2 are erroneously described in the connector diagram or the matrix table.

[Success/Failure Determination by Housing Color]

Housing color may be described in the connector diagram. There are several reasons why the housing is color-coded in this way, and more reasons can be cited, such as for easy distinction by the operator between the two connectors to connect the two wire harnesses wired on the vehicle during the W to W connection, for easy distinction of the connectors that are relatively important and include the circuit wires of important electric systems, and the like. Therefore, when the connectors CONNECTOR 1 and CONNECTOR 2 are described in the same color, it is determined that the connectors CONNECTOR 1 and CONNECTOR 2 can be fitted from a viewpoint of housing color. When the same color is not described, it is determined that one or both of the connector CONNECTOR 1 and the connector CONNECTOR 2 are erroneously described in the connector diagram.

[Success/Failure Determination According to Presence/Absence of Terminals Located at Circuit Wire End Portions]

Each of the connectors CONNECTOR 1 and CONNECTOR 2 used for the W to W connection must include terminals that connect the circuit wires of the electrical systems specified by the assigned specification codes. In other words, the terminals described in the actual wiring diagram of the target electrical system must be described in the connector diagram. Therefore, in the success/failure determination, it is determined whether the connector diagram is short of terminals connecting the circuit wires of the target electrical system. Hereinafter, a case where the connectors CONNECTOR 1 and CONNECTOR 2 shown in the connector diagram of FIG. 7B are specified as being used for the W to W connection will be described as an example. In the connector diagram shown in FIG. 7B, the terminals S111, S112, S113, S115 and S116 are described with respect to the connector CONNECTOR 1, and the terminals S211, S212, S213, S215 and S216 are described with respect to the connector CONNECTOR 2. The terminals S111 to S116 and S211 to S216 are terminals that connect the circuit wires of the electrical systems specified by the specification codes "XXX" and "YYY". In the actual wiring diagrams of the "SYSTEM 1" and the "SYSTEM 2" respectively shown in FIGS. 3 and 5A, at the W to W connection part described as "111×121", the terminals S111, S112, S113, S115 and S116 are described with respect to the connector CONNECTOR 1, and the terminals S211, S212, S213, S215 and S216 are described with respect to the connector CONNECTOR 2. When the terminals described in the connector diagram shown in FIG. 7B are compared with the terminals described in the actual wiring diagrams respectively shown in FIGS. 3 and 5A, there is no shortage in the terminals described in the connector diagram. When there is no shortage in the terminals described in the connector diagram by comparing the connector diagram and the actual wiring diagrams in this way, it is determined that the terminals located at the circuit wire end portions can be fitted when viewed from a viewpoint of specification. When there is shortage of terminals in the connector diagram, it is determined that the terminals are erroneously described in the actual wiring diagrams or the connector diagram.

Similarly, a case where the connectors CONNECTOR 1 and CONNECTOR 2 shown in the connector diagram of FIG. 7C are specified as being used for the W to W connection will be described as an example. In the connector diagram shown in FIG. 7C, the terminals S111, S112, S113 and S118 are described with respect to the connector CONNECTOR 1, and the terminals S211, S212, S213 and S218 are described with respect to the connector CONNECTOR 2. The terminals Sill to S113, S118, S211 to S213 and S218 are terminals that connect the circuit wires of the electrical systems specified by the specification codes "XXX" and "ZZZ". In the actual wiring diagrams of the "SYSTEM 1" and the "SYSTEM 3" respectively shown in FIGS. 3 and 5B, at the W to W connection part described as "111×121", the terminals S11, S112, S113 and S118 are described with respect to the connector CONNECTOR 1, and the terminals S211, S212, S213 and S218 are described with respect to the connector CONNECTOR 2. When the terminals described in the connector diagram shown in FIG. 7C are compared with the terminals described in the actual wiring diagrams shown in FIGS. 3 and 5B, there is no shortage in the terminals described in the connector diagram. Therefore, it is determined that the connectors CONNECTOR 1 and CONNECTOR 2 shown in the connector diagram of FIG. 7C are capable of fitting the terminals located at the circuit wire end portions when viewed from the viewpoint of specification.

Further, a case where the connector CONNECTOR 1 shown in the connector diagram of FIG. 7A and the connector CONNECTOR 2 shown in FIG. 7B are specified as being used for W to W connection will be described as an example. In this example, in order to connect the circuit wires of the electrical system to which the specification code "XXX" is assigned, the connectors CONNECTOR 1 (the specification code "XXX") and CONNECTOR 2 (the specification codes "XXX" and "YYY") are in the W to W connection. In this case, in the connector diagram shown in FIG. 7A, the terminals S111, S112 and S113 are described with respect to the connector CONNECTOR 1, and in the connector diagram shown in FIG. 7B, the terminals S211, S212, S213, S215 and S216 are described with respect to the connector CONNECTOR 2. In the actual wiring diagram of the "SYSTEM 1" shown in FIG. 3, at the W to W connection part described as "111 z 121", the terminals S111, S112 and S113 are described with respect to the connector CONNECTOR 1, and the terminals S211, S212 and S213 are described with respect to the connector CONNECTOR 2. When the terminals described in the connector diagrams shown in FIGS. 7A and 7B are compared with the terminals described in the actual wiring diagram shown in FIG. 3, there is no shortage in the terminals described in the connector diagrams. Therefore, it is determined that the connectors CONNECTOR 1 shown in the connector diagram FIG. 7A and CONNECTOR 2 shown in the connector diagram FIG. 7B are capable of fitting the terminals located at the circuit wire end portions when viewed from the viewpoint of specification.

[Success/Failure Determination According to Cavity Position where Terminal is Accommodated]

Figure 9:
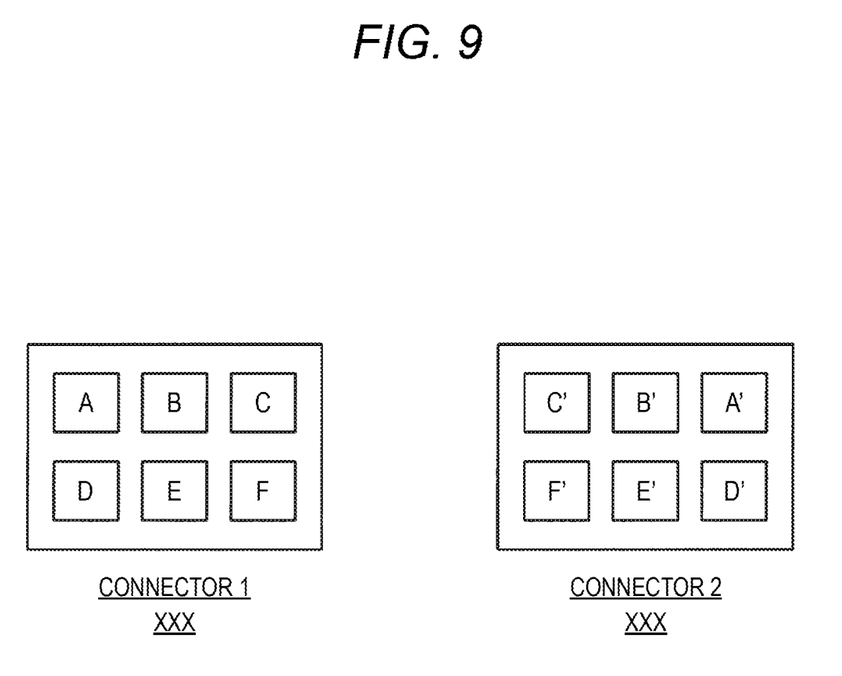
FIG. 9 is a connector diagram describing cavity positions.

The connector diagram describes positional relationship between a cavity provided in the housing and a terminal accommodated in the cavity. When it is determined that fitting is possible by the above-described [success/failure determination according to presence/absence of terminals located at circuit wire end portions] and all the terminals used for the W to W connection exist, subsequently, it is determined whether the cavity positions of the terminals provided in the connector CONNECTOR 1 and the terminals provided in the connector CONNECTOR 2 correspond to each other. In other words, it is determined whether a pair of terminals described as connecting in the actual wiring diagram is accommodated in a pair of cavities facing each other when the connectors CONNECTOR 1 and CONNECTOR 2 are fitted. Specifically, in a connector diagram describing cavity positions shown in FIG. 9, identifiers A to F are respectively assigned to cavities in the connector CONNECTOR 1, and identifiers A' to F' are respectively assigned to cavities in the connector CONNECTOR 2. Since the connector diagram is drawn as a plan view as viewed from the front side of fitting the target connector to the mating connector, it is to be noted that positional relationship between cavities of the connector CONNECTOR 1 and the connector CONNECTOR 2 shown in FIG. 9 are horizontally inverted. It is specified that a pair of terminals is accommodated in each pair of cavities A-A', B-B', C-C', D-D', E-E' and F-F' facing each other when the two connectors are fitted, and it is determined whether all the pairs of terminals coincide in relationship of the W to W connection part in the actual wiring diagram. When all the pairs of terminals coincide with each other, it is determined that the terminals can be fitted from a viewpoint of terminal accommodation position in cavity. When one pair of the pairs of terminals does not coincide with each other, or a terminal is not present in a cavity of the mating connector, it is determined that the terminals are erroneously described in the actual wiring diagram or the connector diagram.

[Output of Conduction Inspection Result]

When all the inspection items of the above-described [processing of determining conduction success/failure of circuit wire] are accepted, it is determined that the actual wiring diagram and the connector diagram concerning W to W targeted this time are correct, and the circuit designer is notified that the conduction inspection is successful (S805, referred to as a result output step in the specification). When any inspection item of the above-described [processing of determining conduction success/failure of circuit wire] is rejected, it is determined that there is an error in the description of the actual wiring diagram and the connector diagram concerning the W to W targeted this time, and the circuit designer is notified that the conduction inspection fails. When the circuit designer is notified that the conduction inspection fails, at the same time it is better to present failed inspection items, information having erroneous descriptions (one or more matrix tables, actual wiring diagrams and connector diagrams) and description place of the information.

[Conduction Inspection Method According to Embodiment of Invention]

The conduction inspection method according to the embodiment of the invention has been described above in detail. According to the conduction inspection method according to the embodiment of the invention, with reference to the matrix table, the actual wiring diagram and the connector diagram, the conduction inspection can be performed on the connection part of the W to W connection at the intermediate stage before the connector and wiring information for each portion is created, and the actual wiring diagram and the connector diagram as the intermediate deliverables can be verified. Since the connector and wiring information for each portion is required, the conduction inspection method disclosed in JP-A-2011-137800, JP-A-2011-170454 and JP-A-2011-180115 in related art cannot be performed at the intermediate stage before the connector and wiring information for each portion is created once. The conduction inspection is performed on the connection part of the W to W connection by the conduction inspection method according to the embodiment of the invention, so that the manpower for creating the connector and wiring information for each portion can be reduced by lowering the frequency of correcting the connector and wiring information for each portion that has been generated so far.

According to the conduction inspection method according to the embodiment of the invention, the wirings used for the W to W connection can be specified with high accuracy. The wire harness may include a plurality of connectors to which the same identifier is assigned. Only by specifying a connector, the connector may be not used for the W to W connection on which the conduction inspection is desired to perform. According to the invention, the connectors used for the W to W connection are specified in the wire harness specification step S802 and the connector specification step S803. Since the connectors used for the W to W connection can be specified by following the specification codes of the matrix table in this way, the connectors used for the W to W connection can be specified by the simple processing, and the inspection accuracy can be improved in order to perform the conduction inspection on the wirings that truly requires the conduction inspection.

According to the conduction inspection method according to the embodiment of the invention, when the circuit designer is notified that the conduction inspection fails, the information useful for the circuit designer can be provided by presenting the failed inspection items as well as the information having erroneous descriptions (one or more matrix tables, actual wiring diagrams and connector diagrams). Accordingly, the circuit designer can see where the erroneous description is located in a short time.

In the actual wiring diagram, wirings are described on one side of the divided area in description of the connection part of the W to W connection, while wirings are not described on the other side of the divided area. In other words, the circuit configuration of the electrical system is insufficient only by the wirings described in the single actual wiring diagram. Such an actual wiring diagram is generated because the wirings located on the other side are shared by the wirings used in another electrical system. In such an actual wiring diagram, since there is no information on the connector and the terminals located on the other side, the conduction inspection can be performed on the connection part of the W to W connection only with the actual wiring diagram.

However, even if there is no description of one of the connectors used for the W to W connection in the actual wiring diagram X, when another actual wiring diagram Y has a description about one of the connectors, the actual wiring diagram obtained by integrating these actual wiring diagrams as shown in FIGS. 6A and 6B may be used as the target of the conduction inspection of the connection part of the W to W connection. In this way, the conduction inspection can be performed on the connection part of the W to W connection even with respect to an actual wiring diagram in which the circuit configuration of the electrical system is insufficient only by the wirings described in one actual wiring diagram.

Here, the features of the wire harness conduction inspection method and the wire harness conduction inspection program according to the above-described invention will be briefly summarized in the following [1] to [4] respectively.

[1] A wire harness conduction inspection method, wherein based on (i) an actual wiring diagram that describes wirings to drive a certain electrical system mounted on a vehicle, (ii) a matrix table that describes specification for a wire harness to identify the electrical system constituting a portion of a circuit, for each wire harness mounted on the vehicle, and (iii) a connector diagram that describes a connector, a corresponding relationship between the connector and the wirings, and specification for the connector to identify the electrical system constituting the portion of the circuit, a computer determines whether wirings included in two wire harnesses arranged in adjacent divided areas are conducted by a connector that connects the two wire harnesses.

[2] The wire harness conduction inspection method according to [1], comprising:

a connection part detection step (S801) of detecting the connector that connects the two wire harnesses with reference to the actual wiring diagram;

a wire harness specification step (S802) of specifying a pair of wire harnesses having common specification assigned to the wire harnesses among the wire harnesses wired in each of the adjacent divided areas with reference to the matrix table;

a connector specification step (S803) of specifying the connector to which specification identical to the common specification of the pair of wire harnesses specified in the wire harness specification step is assigned with reference to the connector diagram; and a conduction determination step (S804) of determining whether the wirings included in the two wire harnesses are conducted by the connector with reference to the connector diagram that describes the connector specified by the connector specification step and the actual wiring diagram that describes the wirings of the electrical system to which the common specification is assigned.

[3] The wire harness conduction inspection method according to [2], wherein the wire harness conduction inspection method further includes a result output step (S805) of outputting conduction success/failure determined in the conduction determination step (S804), and wherein the result output step (S805) presents failed inspection items as well as on or more matrix tables, actual wiring diagrams and connector diagrams having erroneous descriptions when outputting the conduction failure.

[4] A wire harness conduction inspection program, wherein the wire harness conduction inspection program causes a computer to execute each step of the conduction inspection method according to any of [1] to [3].

What is claimed is:

1. A wire harness conduction inspection method performed by a computer comprising determining whether wirings included in two wire harnesses arranged in adjacent divided areas are conducted by a connector that connects the two wire harnesses, based on
    an actual wiring diagram that describes wirings to drive a certain electrical system mounted on a vehicle,
    a matrix table that describes specification for a wire harness to identify the electrical system constituting a portion of a circuit, for each wire harness mounted on the vehicle, and
    a connector diagram that describes a connector, a corresponding relationship between the connector and the wirings, and specification for the connector to identify the electrical system constituting the portion of the circuit,
    wherein the wire harness conduction inspection method further includes
        detecting the connector that connects the two wire harnesses with reference to the actual wiring diagram;
        specifying a pair of wire harnesses having common specification assigned to the wire harnesses among the wire harnesses wired in each of the adjacent divided areas with reference to the matrix table;
        specifying the connector to which specification identical to the common specification of the pair of wire harnesses specified in the wire harness specification step is assigned with reference to the connector diagram; and
        determining whether the wirings included in the two wire harnesses are conducted by the connector with reference to the connector diagram that describes the connector specified by the connector specification step and the actual wiring diagram that describes the wirings of the electrical system to which the common specification is assigned.

2. The wire harness conduction inspection method according to claim 1 further comprising outputting conduction success/failure determined in the determining of the conduction of the wirings, and
    wherein the result output step presents failed inspection items as well as at least one of matrix tables, actual wiring diagrams and connector diagrams having erroneous descriptions when outputting the conduction failure.

3. A non-transitory computer readable medium storing a program causing a computer to execute a process for a wire harness conduction inspection method, the process comprising determining whether wirings included in two wire harnesses arranged in adjacent divided areas are conducted by a connector that connects the two wire harnesses, based on
    an actual wiring diagram that describes wirings to drive a certain electrical system mounted on a vehicle,
    a matrix table that describes specification for a wire harness to identify the electrical system constituting a portion of a circuit, for each wire harness mounted on the vehicle, and
    a connector diagram that describes a connector, a corresponding relationship between the connector and the wirings, and specification for the connector to identify the electrical system constituting the portion of the circuit
    wherein the wire harness conduction inspection method further includes
        detecting the connector that connects the two wire harnesses with reference to the actual wiring diagram;
        specifying a pair of wire harnesses having common specification assigned to the wire harnesses among the wire harnesses wired in each of the adjacent divided areas with reference to the matrix table;
        specifying the connector to which specification identical to the common specification of the pair of wire harnesses specified in the wire harness specification step is assigned with reference to the connector diagram; and
        determining whether the wirings included in the two wire harnesses are conducted by the connector with reference to the connector diagram that describes the connector specified by the connector specification step and the actual wiring diagram that describes the wirings of the electrical system to which the common specification is assigned.

* * * * *